United States Patent
Orava

(10) Patent No.: US 9,023,148 B2
(45) Date of Patent: May 5, 2015

(54) NUCLEATED CEMENTS AND RELATED METHODS

(75) Inventors: John E. Orava, Benicia, CA (US); Janice Lynn Thoren, legal representative, Benicia, CA (US)

(73) Assignee: Orava Applied Technologies Corporation, Albany, NY (US)

( * ) Notice: Subject to any disclaimer, the term of this patent is extended or adjusted under 35 U.S.C. 154(b) by 559 days.

(21) Appl. No.: 13/050,013

(22) Filed: Mar. 17, 2011

(65) Prior Publication Data

US 2012/0234207 A1 Sep. 20, 2012

(51) Int. Cl.
| | |
|---|---|
| *C04B 7/00* | (2006.01) |
| *C04B 7/34* | (2006.01) |
| *C04B 28/00* | (2006.01) |
| *C04B 32/00* | (2006.01) |
| *C04B 12/02* | (2006.01) |
| *C04B 28/34* | (2006.01) |
| *C04B 35/48* | (2006.01) |
| *C04B 35/49* | (2006.01) |
| *C04B 41/00* | (2006.01) |
| *C04B 41/50* | (2006.01) |
| *C04B 41/67* | (2006.01) |
| *C04B 111/00* | (2006.01) |
| *C04B 111/72* | (2006.01) |

(52) U.S. Cl.
CPC ............. *C04B 28/342* (2013.01); *C04B 41/009* (2013.01); *C04B 41/5092* (2013.01); *C04B 41/67* (2013.01); *C04B 2111/00482* (2013.01); *C04B 2111/72* (2013.01)

(58) Field of Classification Search
USPC ..................... 501/84, 103, 105; 106/638, 690
See application file for complete search history.

(56) References Cited

U.S. PATENT DOCUMENTS

| | | | | |
|---|---|---|---|---|
| 4,978,642 | A * | 12/1990 | Barrall ............................ | 501/84 |
| 6,458,423 | B1 * | 10/2002 | Goodson ....................... | 427/403 |
| 2003/0005860 | A1 * | 1/2003 | Goodson ....................... | 106/705 |

* cited by examiner

*Primary Examiner* — Kaj K Olsen
*Assistant Examiner* — Karam Hijji
(74) *Attorney, Agent, or Firm* — Schmeiser, Olsen & Watts, LLP

(57) ABSTRACT

Methods and a kit. A cement forming method includes nucleating an acidic metallophosphate reaction mixture with first particles, resulting in forming a settable metallophosphate cement from the acidic metallophosphate reaction mixture. The first particles include a first metal oxide. Each particle of the first particles independently have a particle size in a range from about 15 microns to about 450 microns. A method for applying cement includes seeding a solution with particles, resulting in forming a settable cement from the solution. The particles have a size in a range from about 15 microns to about 450 microns. The solution includes a first metal oxide reacting with phosphate. The settable cement is applied to a substrate. A cement application kit is also described.

14 Claims, 4 Drawing Sheets

NUCLEATED CEMENTS AND RELATED METHODS

FIELD OF TECHNOLOGY

The invention generally relates to cements and method for making and using cements, and specifically to metallophosphate cements and methods for making and using the same.

BACKGROUND

Metallophosphate cements are used in many applications. For example, magnesium phosphate cements have been used as patching materials for roads. In addition, cements such as calcium phosphate and zinc phosphate cements are also used in dental applications, such as in crowns for teeth. However, the reactions are highly exothermic and proceed at very rapid rates, making usage over large areas problematic. In addition, the high temperatures associated with the reactions are not compatible for use with temperature sensitive systems. There exists a need for controlled methods for making and using metallophosphate cements that are compatible with live tissue.

SUMMARY

The present invention relates to a cement forming method, comprising:
    nucleating an acidic metallophosphate reaction mixture with first particles, said first particles comprising a first metal oxide, each particle of said first particles independently having a particle size in a range from about 15 microns to about 450 microns, resulting in forming a settable metallophosphate cement from said acidic metallophosphate reaction mixture.

The present invention relates to a method for applying cement, comprising:
    seeding a solution with particles, said particles having a size in a range from about 15 microns to about 450 microns, said solution comprising a first metal oxide reacting with phosphate, resulting in forming a settable cement from said solution; and
    applying said settable cement to a substrate.

The present invention relates to a cement application kit, comprising:
    a container having at least two compartments, a first compartment of said at least two compartments separated from a second compartment of said at least two compartments by an openable barrier;
    a first metal oxide having a particle size in a range from about 15 microns to about 450 microns, said first metal oxide disposed in said first compartment; and
    a phosphate solution disposed in said second compartment.

BRIEF DESCRIPTION OF THE DRAWINGS

The features of the invention are set forth in the appended claims. The invention itself, however, will be best understood by reference to the following detailed description of illustrative embodiments when read in conjunction with the accompanying drawings.

DETAILED DESCRIPTION

Figure 1:
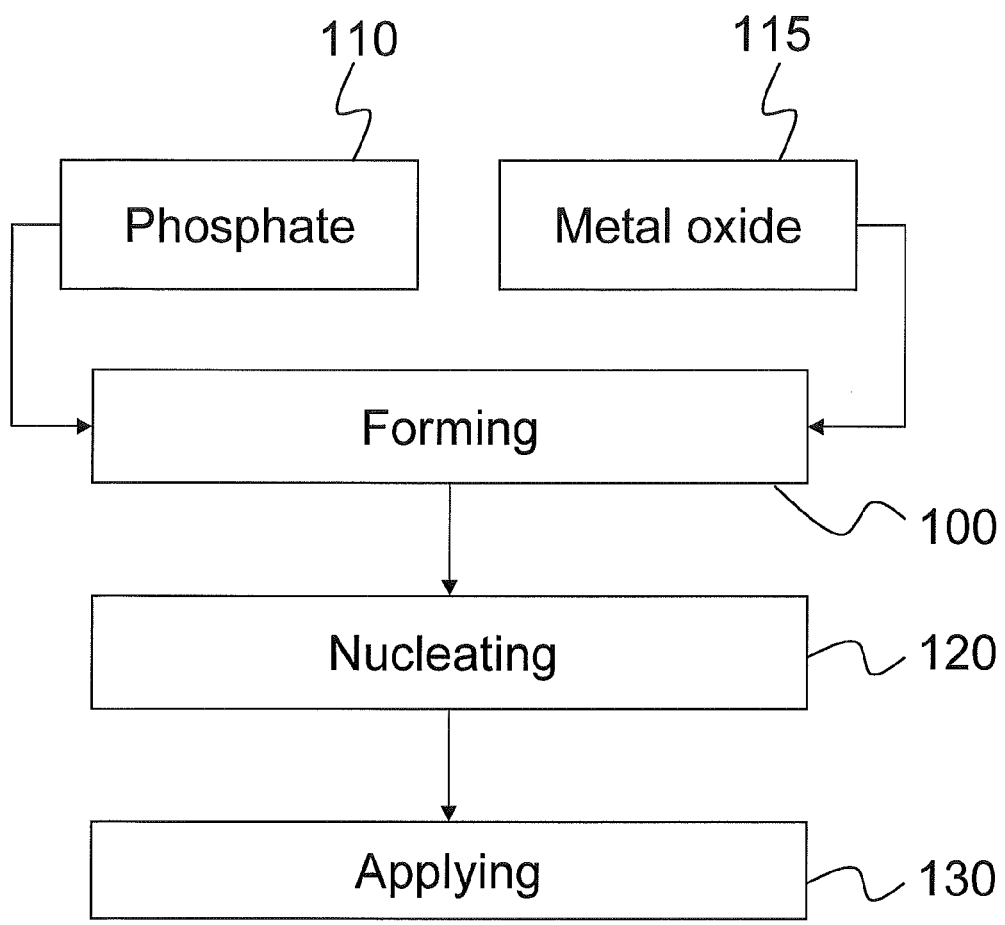
FIG. 1 is a flow chart illustrating an example of an embodiment of a method for forming cement, in accordance with embodiments of the present invention.

Although certain embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as examples of embodiments. The features and advantages of the present invention are illustrated in detail in the accompanying drawings, wherein like reference numerals refer to like elements throughout the drawings. Although the drawings are intended to illustrate the present invention, the drawings are not necessarily drawn to scale.

FIG. 1 is a flow chart illustrating an example of an embodiment of a method for forming cement. Step 100 comprises forming a metallophosphate reaction mixture. The metallophosphate reaction mixture may, for example, be formed by combining a first metal oxide 115 with a phosphate source 110, such as by combining the first metal oxide 115 with a solution of phosphate. The combining of the first metal oxide 115 and the phosphate source 110 may result in a reaction between the first metal oxide 115 and the phosphate source 110 in solution. For example, dissolving a first metal oxide 110 into a solution containing phosphate, may result in the phosphate reacting with the first metal oxide. The phosphate source may comprise a solid or a liquid. The phosphate source may comprise, for example, an aqueous solution of a phosphate compound. Examples of suitable phosphate compounds include monopotassium phosphate, dipotassium phosphate, tetrapotassium pyrophosphate, potassium tripolyphosphate, orthophosphoric acid, orthophosphate, polyphosphoric acids, polyphosphates, branched polyphosphates, phosphate esters, phosphite esters, branched polyphosphates, cyclophosphoric acids, metaphosphoric acids, cyclophosphates, metaphosphates, phosphoric anhydride, the like, and combinations thereof.

Examples of suitable metal oxides include magnesium oxides, aluminum oxides, zinc oxides, iron oxides, barium oxides, calcium oxides, yttrium oxides, cerium oxides, titanium oxides, zirconium oxides, silicon oxides, and combinations thereof. In embodiments using MgO as a metal oxide may comprise light burned MgO, dead burned MgO, hard burned MgO, or a combination of these.

The first metal oxide 115 may comprise particles of the first metal oxide 115 having a particle size. The particles may each independently have a particle size in a range from about 15 microns to about 40 microns. The concentration of the phosphate in the solution may be in stoichiometric excess with respect to the concentration of the first metal oxide 115 in the solution, i.e. the phosphate may be in excess of the first metal oxide. Reacting the first metal oxide 115 with phosphoric acid may result in forming an acidic metallophosphate reaction mixture, which may be in the form of a fluid such as solution or slurry. The pH of the acidic metallophosphate reaction mixture may be less than about 6, such as between about 3 and about 5.

After forming the acidic metallophosphate reaction mixture, the reaction mixture may be cooled, such as to ambient temperatures (such as between about 20° C. and about 40° C.)

or sub-ambient temperatures, such as below about 20° C. The reaction between the metal oxide and the phosphate may be exothermic, and thus cooling the reaction mixture may serve to bring the temperature of the reaction mixture to a more manageable temperature for handing and/or for biologically related usage, and/or may drive the reaction equilibrium farther to completion.

Step 105 comprises nucleating the metallophosphate reaction mixture of step 100, resulting in forming a settable metallophosphate cement from the acidic metallophosphate reaction mixture. As used herein, the term settable means having the ability to set, cure, harden, fix, stiffen, or otherwise transform from a fluid consistency to a solid consistency, through chemical reaction, physical transformation, or a combination thereof. Nucleating may comprise, for example, seeding the reaction mixture of step 100 by adding particles to the reaction mixture, resulting in the particles forming nucleation centers or sites of crystal or aggregate formation of a metallophosphate cement. For example, nucleating may comprise seeding a solution with particles, where the solution comprises a first metal oxide reacting with phosphate.

The particles for seeding may comprise any material on which a metallophosphate cement may aggregate or crystallize Examples of suitable materials for particles for seeding include ceramic, a second metal oxide, metals such as silver, metallophosphate compounds, materials coated with one or more metallophosphate compounds, crystalline compounds such as those having Mg or K in their chemical structure, or combinations thereof. Other examples of suitable materials include materials having EMF—(electromagnetic field) or photon-activated surfaces. In some embodiments, the particles for seeding may comprise particles of crushed ceramic or cement such as hardened metallophosphate cement. In another embodiment, the particles may comprise silica particles coated with metallophosphate cement.

The particles for seeding may each independently have a particle size in a range from about 15 microns to about 450 microns. For example, after forming a solution comprising phosphoric acid reacting with a metal oxide, the solution may be seeded with particles of a second metal oxide having sizes in a range from 15 microns to about 450 microns, resulting in forming a settable cement from said solution. The particles for seeding may comprise nanoparticles and may have a particle size in a range from about 0.33 nanometers (nm) to about 1000 nm. The relatively large surface area of nanoparticles may allow for increased reaction rates.

The particles for seeding may, for example, comprise a second metal oxide. The second metal oxide may be the same or different from the first metal oxide 115 used to form the metallophosphate reaction mixture formed in step 100. Examples of suitable oxides for the second metal oxide include those listed above. The second metal oxide may comprise particles of the second metal oxide, where each particle of the first particles independently have a particle size in a range from about 15 microns to about 450 microns. In another embodiment, each particle of the first particles may independently have a particle size in a range from about 0.33 nm to about 1000 nm. The second metal oxide may react with a portion of the phosphate in the metallophosphate reaction mixture. The particles of the second metal oxide may form nucleation sites within the mixture, resulting in forming a settable metallophosphate cement. The amount of the second metal oxide added may be such that the sum of the molar amount of the first metal oxide 115 and the molar amount of the second metal oxide is a stoichiometric amount of metal oxide with respect to the phosphate. In embodiments where the amount of the first metal oxide is less than a stoichiometric amount with respect to the phosphate in solution, the molar sum of the amounts of the second metal oxide and the first metal oxide may be in a range from a stoichiometric amount to about 50% excess of a stoichiometric amount, with respect to the phosphate. The reaction of the second metal oxide with the phosphate in the metallophosphate reaction mixture may raise the pH to greater than about 6.

Blending the second metal oxide with the composition may comprise adding particles of the second metal oxide to the composition until the pH of the resulting mixture is greater than about 6. The second metal oxide may be added continuously or in intermittent small quantities. In some embodiments, the second metal oxide may be automatically added until the pH is greater than about 6. For example, an automated mixing system may measure the pH of the mixture as the second metal oxide is added, stopping the addition of the second metal oxide when the pH reaches a predetermined value, such as a value greater than about 6.

A third material or additive may be mixed with the metallophosphate reaction mixture, such as a filler or a reinforcing material, for example. The reaction mixture may comprise up to about 30% by weight of the third material. Examples of the third material include silica, wollastonite, silica fume, coesite, flyash, fiberglass, carbon fiber, basalt fiber, polymers, biological materials, nanoparticles, spider silk, Superconducting Quantum Interference Devices (SQUIDs), plant materials, and combinations thereof. An example of plant material is rice husk.

The third material may include a gas such as air, argon, nitrogen, oxygen, the like, and combinations thereof. For example, the inclusion of air gaps in the final set cement may increase biocompatibility. The third material may comprise a reactive gas such as chlorine or fluorine.

The third material may be selected to adjust the final properties of the cured cement, where such properties may include density, thermal expansion, hardness, magnetism, conductivity, combinations thereof, etc. For example the third material may comprise a polymer such as polystyrene, such as polystyrene foam for example. The use of polystyrene foam may reduce the density of the cement. Other materials, such as carbon fiber, may be used as a third material to increase the strength and/or heat resistance of the cement. The use of magnetic materials, such as iron, may be used to render the cement magnetic. The use of fly ash may increase the workability or flowability of the cement. The third material may be mixed before or during the blending of the second metal oxide with the metallophosphate reaction mixture formed in step 100 above.

The third material may comprise a reactive filler, where a reactive filler is described as a filler which raises the pH of the metallophosphate reaction mixture. Fly ash and fibrous wollastonite, and powdered wollastonite are examples of reactive fillers. In embodiments where a reactive filler is added, the amount of oxides and/or phosphate may be adjusted to produce a final pH in a suitable range for a settable cement, such as greater than about 6. The methods described herein are not limited to any particular filler, and those skilled in the art will recognize there exist numerous suitable fillers, all of which are intended to be included within the scope of embodiments disclosed herein.

Step 130 comprises applying the settable cement to a substrate. The substrate may comprise a material such as cement, concrete, stone, glass, animal bone, animal tooth material, animal tissue, wood, metal, plastic, ceramic, crystalline material, plant material (such as burlap) and combinations thereof. For example, the settable cement may be used to reconstruct a section of bone in a patient (such as in a fractured area), where the cement is applied to the portion of bone, either in a single application or in multiple applications, and allowed to set or harden, resulting in forming a repaired and/or reinforced area along the section. In another example, the surface may comprise concrete, where the settable cement may be applied to fill or otherwise repair a crack or opening in a section of concrete. The settable cement may be used to fill the section and then allowed to harden, resulting repairing the broken section of concrete.

The cements and related methods described herein may be at ambient or sub-ambient temperatures during curing and thus have an advantage over compositions requiring thermal curing. Settable cement compositions requiring thermal curing at elevated temperatures may not be suitable for use in temperature sensitive applications. The ambient and sub-ambient temperatures of the curing steps described herein are compatable with temperature sensitive systems, such as live tissue, and are practical for use in areas where thermal curing is not possible, such as concrete repair. The ambient and sub-ambient temperatures of the cements described herein may also permit the safe embedding of temperature sensitive elements, such as electronics and plastics. In addition, the use of ambient and sub-ambient temperatures for the methods described herein may allow for the use of temperature sensitive additives which may impart improved properties on the final set cement. For example, the use of biomaterials may be incorporated into the reaction mixtures described herein without thermal degradation associated with high temperature curing methods, by the use of ambient or sub-ambient curing conditions.

The cements described herein may be amorphous, crystalline, or semi-crystalline in structure. Crystalline and semi-crystalline embodiments of the cements herein may be similar in structure to ceramics, yet do not require the thermal curing which is characteristic of ceramics. Thus the cements described herein may be described as comprising a hybrid between cement which cures by reaction with water at ambient temperature and ceramic having crystalline or semi-crystalline structure.

Figure 2A:
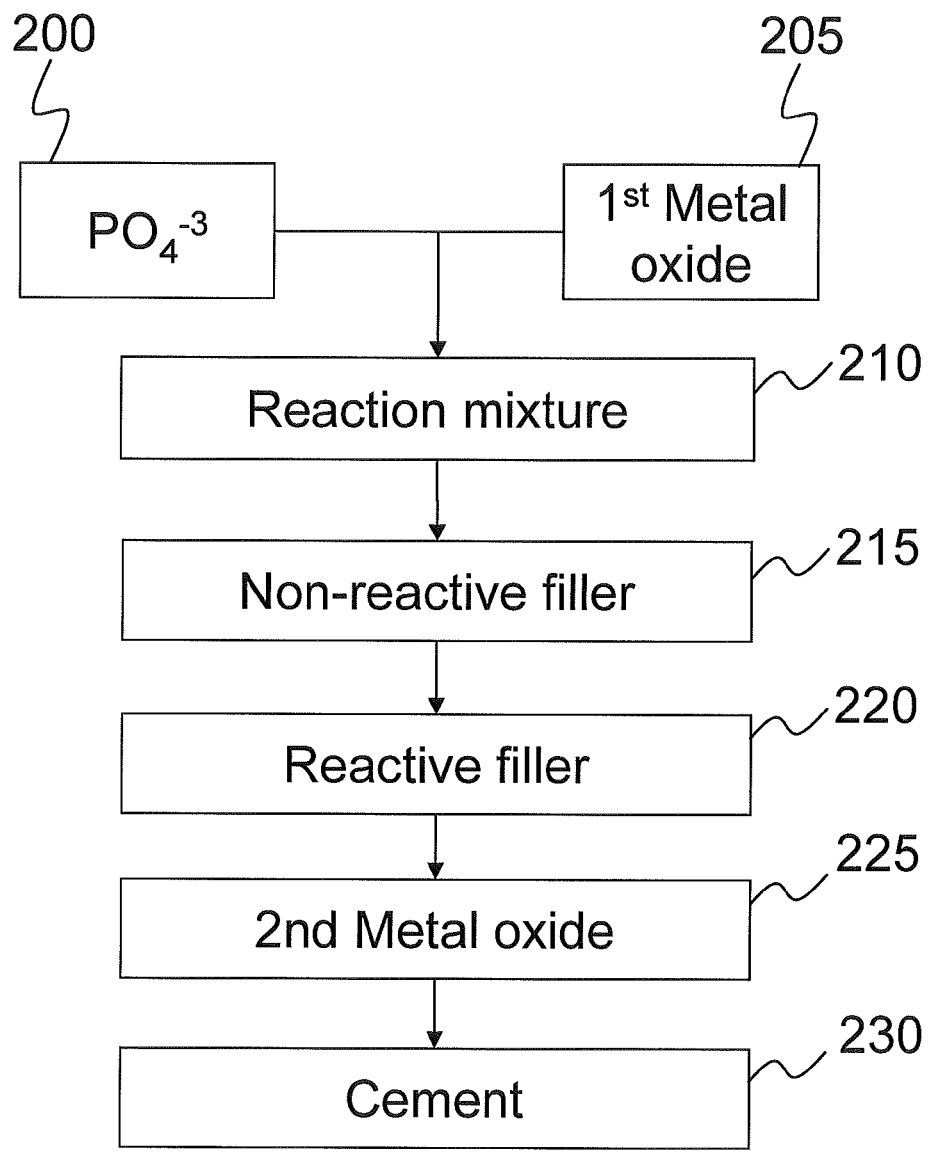
FIG. 2A is a flow chart representing an embodiment of methods described for FIG. 1, in accordance with embodiments of the present invention.

FIG. 2A is a flow chart representing an embodiment of methods described for FIG. 1 above. A phosphate source 200 (such as a phosphoric acid solution) is combined with a first metal oxide 205, such as MgO, resulting in forming a reaction mixture in step 210. The phosphate 200 may be in stoichiometric excess with respect to the metal oxide 205, resulting in an reaction mixture having a pH lower than about 6, such as between about 3 and about 6.

A non-reactive filler may be added in step 215 to the reaction mixture. A non-reactive filler is described as a filler which does not affect the pH of the reaction mixture, such as silica or carbon fiber. A reactive filler may be added in step 220, where a reactive filler is described as a filler which affects the pH of the reaction mixture, such as fly ash which may increase the pH.

Step 225 comprises seeding or nucleating the reaction mixture with particles of a second metal oxide. The addition of the second metal oxide may raise the pH of the reaction mixture above about 6, resulting in the formation of a settable metallophosphate cement in step 230. An example reaction is shown below:

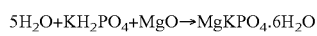

where a first metal oxide comprising MgO reacts with a phosphate source comprising $KH_2PO_4$ resulting in forming a metallophosphate cement $MgKPO_4 \cdot 6H_2O$.

The second metal oxide may comprise a metal oxide as described above, and may have particle sizes in a range from about 15 microns to about 450 microns. In another embodiment, the particle sizes may be in a range from about 0.33 nm to about 1000 nm. The particles of the second metal oxide may act as nucleation sites for the crystallization of metallophosphate compounds resulting from the reaction of the phosphate with the first metal oxide, a portion of the second metal oxide, or both. The first and second metal oxides may be the same or different.

The amount of the second metal oxide added may be determined by the pH of the reaction mixture. For example, as amounts of the second metal oxide are added to the reaction mixture, the pH of the reaction mixture will rise. The addition of the second metal oxide may be stopped when the pH reaches a predetermined value, such as above about 6. The second metal oxide may be added until the combined molar amount of the first metal oxide and the second metal oxide are between about a stoichiometric amount and about 50% in excess of a stoichiometric amount with respect to phosphate, such as between about 10% and about 50% in excess of a stoichiometric amount.

The rate of reaction may be slowed by the use of fillers, which may behave as a heat sink to cool the reaction between the phosphate and the metal oxides. The rate of reaction may be slowed by the use of dead burned MgO as a metal oxide as compared with other forms of magnesium oxide. The rate of the reaction may be slowed by cooling the reaction mixture. The rate of the reaction may be slowed by the addition of acid, thus lowering the pH, as desired by a user.

In some embodiments, the addition of the reactive and non-reactive fillers may be performed after the addition of the second metal oxide. The example shown in FIG. 2A is not meant to be limited by the order of the steps, rather to show an example of an embodiment.

Figure 2B:
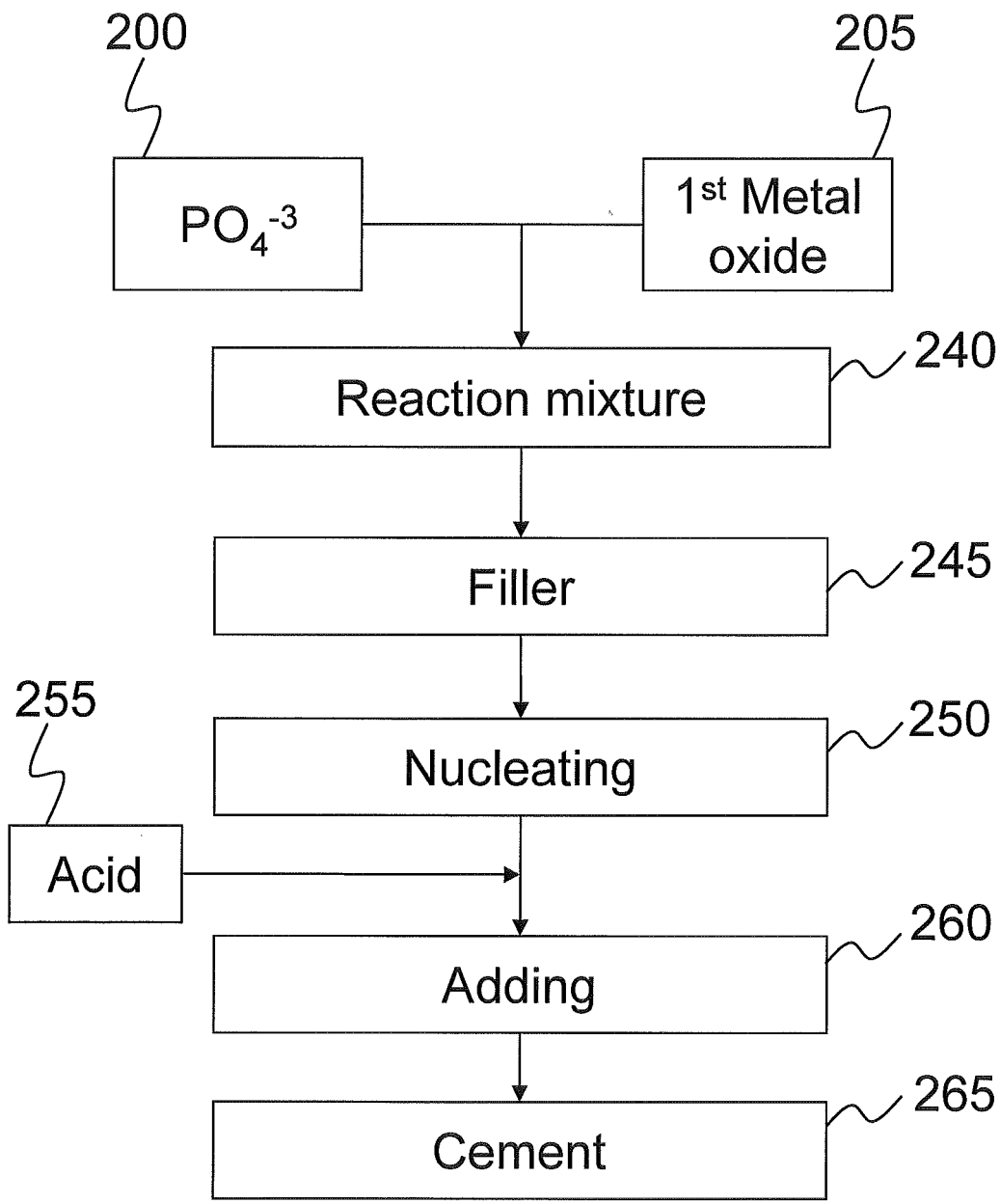
FIG. 2B is a flow chart representing an embodiment of methods described for FIG. 1, in accordance with embodiments of the present invention.

FIG. 2B is a flow chart representing an embodiment of methods described for FIG. 1 above. A phosphate source 200 (such as the phosphate sources described above) is combined with a first metal oxide 205, such as the metal oxides described above, resulting in forming a reaction mixture in step 240.

A filler may be added in step 245, such as the reactive and non-reactive fillers described above. The filler may be added immediately following step 240, or at a later point in the method, and is not necessarily limited to the order shown in FIG. 2B.

Step 250 comprises seeding or nucleating the reaction mixture with particles, where the particles may comprise any material on which a metallophosphate cement may aggregate or crystallize, such as the particles for seeding described above.

After nucleating in step 250, acid 255 may be added to the reaction to lower the pH. Lowering the pH may slow the reaction, resulting in allowing additional working time or for the addition of other ingredients, such as other fillers or additional metal oxides for example.

Step 260 comprises adding additional materials to the reaction. Such materials may comprise fillers or one or more metal oxides, for example. The metal oxides may not necessarily be added in a single step, rather step 260 may comprise a plurality of additions of smaller amounts of metal oxide. Step-wise addition of metal oxide in step 260 may allow for increased control of the reaction rate.

In some embodiments, the methods described above may utilize a cement application kit. The kit may comprise a container having at least two compartments, such as a first compartment and a second compartment. Each compartment of the at least two compartments may be separated from adjacent compartments by one or more openable barriers blocking or otherwise preventing the flow or transfer of material from one compartment into an adjacent compartment.

An openable barrier may be described as a barrier which, in one state, may prevent the flow of material and which, in a second state, may be opened, broken, altered, or removed, thus allowing material to flow from one compartment into an adjoining compartment. Examples of openable barriers include valves, breakable or removable plugs, breakable or removable membranes, the like, or a combination of these. In some embodiments, the openable barrier may comprise a meltable plug or membrane (such as a wax plug or membrane), which may melt at a specified temperature, thus opening to allow flow of material from one compartment into another. The blocking by the openable barrier may comprise blocking in one direction or both directions. For example, an openable barrier which blocks flow in only one direction, may comprise a one-way check valve.

In some embodiments, the compartments may be interconnected by channels. The channels may each have an openable barrier disposed therein preventing the flow of material through each channel into an adjoining compartment. For example, a first compartment may be connected to the second compartment through a first channel. In another embodiment, a third compartment may be connected to the second compartment through a second channel, to the first compartment through a third channel, or both.

The compartments of the container may hold and separate components used in the cement forming methods described herein. For example, a first metal oxide may be disposed inside a first compartment and a phosphate solution may be disposed in a second compartment. The phosphate solution may comprise phosphate compounds as described above. The first metal oxide may comprise a metal oxide as described above, such as a metal oxide having a particle size in a range from about 15 microns to about 450 microns, or a metal oxide having a particle size in a range from about 0.33 nm to about 1000 nm.

The container may comprise a second metal oxide disposed inside a third compartment, where the first and second metal oxides may be the same or different. The first metal oxide may have a particle size in a range from about 15 microns to about 40 microns, and the second metal oxide may have a particle size in a range from about 15 microns to about 450 microns.

A user may mix the first metal oxide in the first compartment with the phosphate solution in the second by opening an openable barrier between the first and second compartments and transferring the contents of one compartment into the other. For example, the phosphate solution may be transferred into the compartment containing the metal oxide, to form a solution comprising the first metal oxide reacting with the phosphate. Then the second metal oxide may be added to the solution, resulting in forming a settable cement from the solution.

Figure 3:
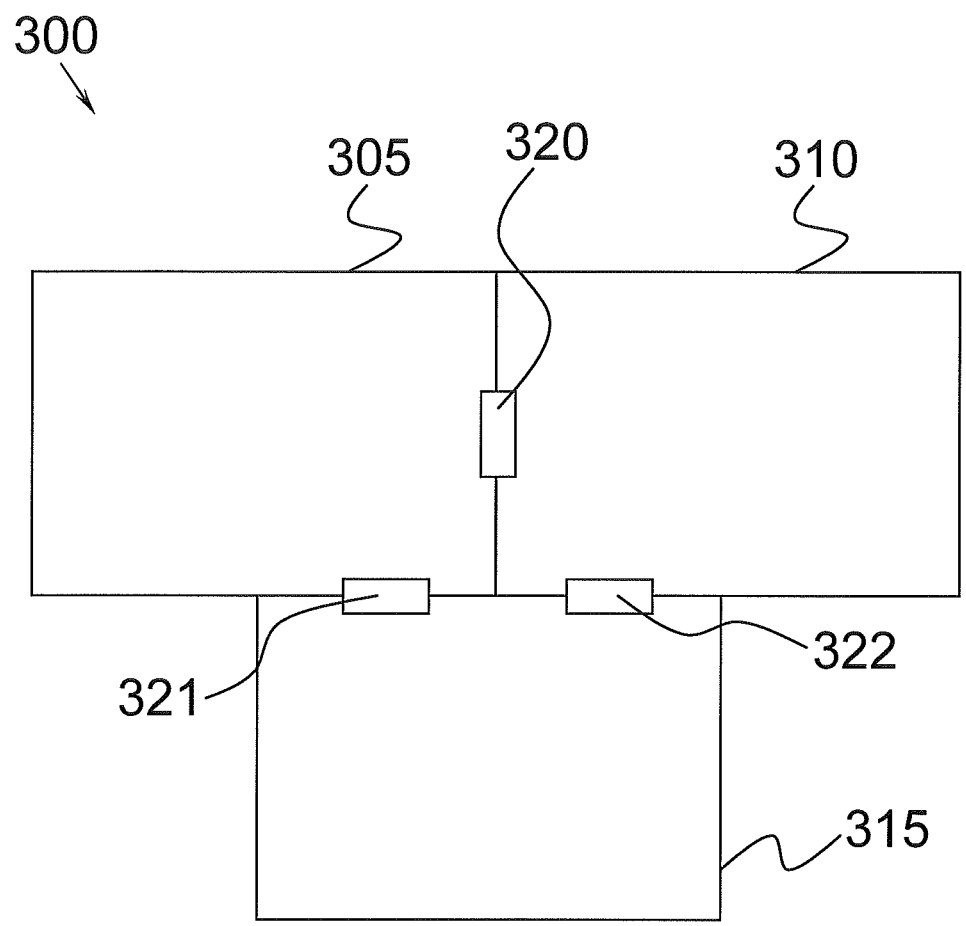
FIG. 3 is an illustration of an embodiment of a container, in accordance with embodiments of the present invention.

FIG. 3 is an illustration of an embodiment of a container 300 comprising at least two compartments, as described above. The container 300 of FIG. 3 comprises a first compartment 305, a second compartment 310, and a third compartment 315. The container 300 comprises openable barriers 320, 321, and 322, where the openable barriers prevent the flow of material between adjacent compartments. Opening the openable barriers may allow material disposed in one compartment to flow into an adjacent compartment. For example, opening openable barrier 320 may allow material to flow from compartment 305 into compartment 310, or from compartment 310 into compartment 305.

The foregoing description of the embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A cement forming method, comprising:
providing an acidic metallophosphate reaction mixture, said acidic metallophosphate reaction mixture comprising a first metal oxide;
nucleating the acidic metallophosphate reaction mixture only with particles consisting of a second metal oxide to form a plurality of nucleation centers of crystal or aggregate formation, each particle of said particles independently having a particle size in a range from about 15 microns to about 450 microns; and
after nucleating, adding acid to the nucleated acidic metallophosphate reaction mixture to slow the reaction, resulting in allowing additional working time;
wherein a settable metallophosphate cement is formed from said acidic metallophosphate reaction mixture.

2. The method of claim 1, wherein said acidic metallophosphate reaction mixture comprises the reaction mixture of the first metal oxide in a solution comprising phosphoric acid, said phosphoric acid in stoichiometric excess of said second metal oxide.

3. The method of claim 1, wherein said first metal oxide is different from said second metal oxide.

4. The method of claim 1, wherein said first metal oxide and said second metal oxide are each independently selected from the group consisting of magnesium oxides, aluminum oxides, zinc oxides, iron oxides, barium oxides, calcium oxides, yttrium oxides, cerium oxides, titanium oxides, zirconium oxides, silicon oxides, and combinations thereof.

5. The method of claim 2, wherein said acidic metallophosphate reaction mixture is formed by mixing first particles comprising the first metal oxide into the solution comprising phosphoric acid, said first particles having a particle size between about 15 microns and about 40 microns.

6. The method of claim 1, wherein a third material selected from the group consisting of silica, wollastonite, silica fume, coesite, flyash, fiberglass, carbon fiber, basalt fiber, polymers, biological materials, nanoparticles, spider silk, Superconducting Quantum Interference Devices, and combinations thereof.

7. The method of claim 1, wherein said acidic metallophosphate reaction mixture has a pH less than about 6.

8. The method of claim 1, wherein said nucleating said acidic metallophosphate reaction mixture with said particles of said second metal oxide comprises adding said particles of said second metal oxide to said acidic metallophosphate reaction mixture until a pH of said acidic metallophosphate reaction mixture is about 6 or greater.

9. The method of claim 8, wherein said adding comprises adding automatically based on said pH.

10. A cement forming method, comprising:
providing an acidic metallophosphate reaction mixture, said acidic metallophosphate reaction mixture comprising a first metal oxide;
nucleating an acidic metallophosphate reaction mixture only with particles to form a plurality of nucleation centers of crystal or aggregate formation, said particles comprising a second metal oxide, each particle of said second particles independently having a particle size in a range from about 15 microns to about 450 microns, resulting in forming a settable metallophosphate cement from said acidic metallophosphate reaction mixture;

wherein the second metal oxide is automatically added by an automated mixing system until the pH is greater than about 6, the automated mixing system measuring the pH while the second metal oxide is added to the acidic metallophosphate reaction mixture.

11. The method of claim 10, wherein said acidic metallophosphate reaction mixture comprises a reaction mixture of a first metal oxide in a solution comprising phosphoric acid, said phosphoric acid in stoichiometric excess of said first metal oxide.

12. The method of claim 10, wherein said first metal oxide is different from said second metal oxide.

13. The method of claim 10, wherein said first metal oxide and said second metal oxide are each independently selected from the group consisting of magnesium oxides, aluminum oxides, zinc oxides, iron oxides, barium oxides, calcium oxides, yttrium oxides, cerium oxides, titanium oxides, zirconium oxides, silicon oxides, and combinations thereof.

14. The method of claim 10, wherein said acidic metallophosphate reaction mixture comprises a third material selected from the group consisting of silica, wollastonite, silica fume, coesite, flyash, fiberglass, carbon fiber, basalt fiber, polymers, biological materials, nanoparticles, spider silk, Superconducting Quantum Interference Devices, and combinations thereof.

* * * * *